April 1, 1952      K. E. BEMIS      2,590,921
BATTER DISPENSER
Filed Dec. 5, 1949
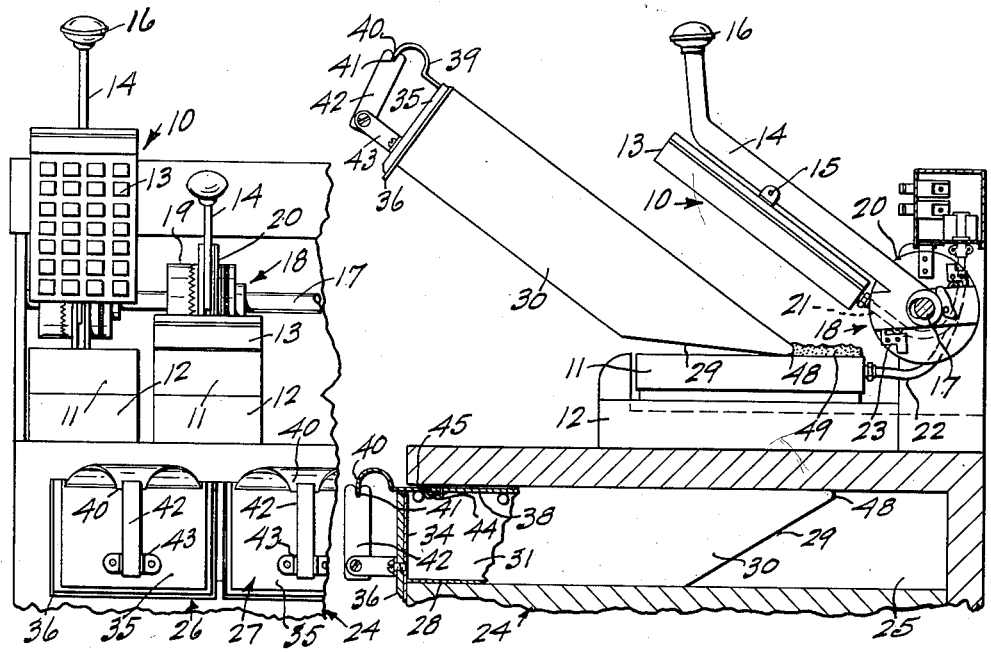
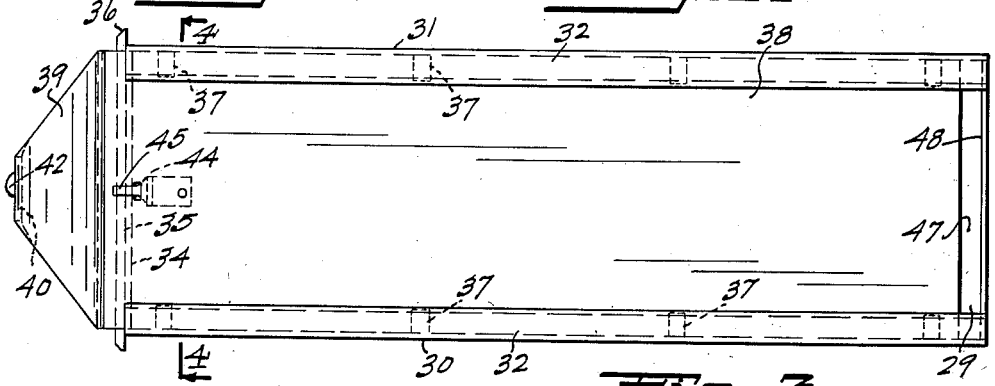
INVENTOR.
Ken E. Bemis
BY
Philip A. Friedell
Attorney Patented Apr. 1, 1952

2,590,921

UNITED STATES PATENT OFFICE 2,590,921

BATTER DISPENSER

Ken E. Bemis, Oakland, Calif.

Application December 5, 1949, Serial No. 131,115

5 Claims. (Cl. 107—52)

This invention relates to improvements in batter dispensers, and particularly to waffle batter dispensers for rectangular waffle irons, and which is particularly designed to dispense batter evenly over the surface of the lower grid of the waffle iron when the upper grid is limited to opening to an angle of 45 degrees or less, though it is exceptionally convenient, accurate, and rapid for dispensing to any rectangular waffle iron irrespective of the degree to which the upper grid can be raised.

In addition, this waffle batter dispenser automatically opens and closes through the regular movements of lowering to and raising from the grid; the dispenser having a handle at one end by which it is held by one hand while the other hand supports the dispensing end, and when the dispensing end is lowered, the normal grip and resistance on the handle acts to retain the handle in its instant position to withdraw the cover to a fixed degree to provide a relatively thin ribbon of batter on the grid as the dispensing end is retracted, and when the dispensing end is again raised, the cover is automatically closed by relative raising of the dispensing end.

In addition to the above, this dispenser is made in the form of a drawer to fit in a drawer space in a refrigerating cabinet and having a head plate to seal the cabinet, thereby functioning as an essential part of the cabinet which in turn is essential to prevent deterioration or spoilage of the batter and maintain the batter at a uniform temperature for automatic baking of the waffles.

The objects and advantages of the invention are as follows:

First, to provide a batter dispenser which is specifically adapted for dispensing the batter to a waffle iron having rectangular grids.

Second, to provide a dispenser as outlined which will dispense the batter in a relatively thin ribbon over the entire width of the grid.

Third, to provide a dispenser as outlined with a cover member which is automatically opened and closed through retention of the handle in a specific position when the dispenser is tilted for dispensing and raised after dispensing is completed.

Fourth, to provide a dispenser as outlined in the shape of a drawer to fit in a drawer compartment of a refrigerated cabinet and having a head plate to form a seal for the compartment.

Fifth, to provide a dispenser as outlined which fits into the drawer compartment of a refrigerated cabinet for preserving the batter and for maintaining a uniform temperature for exacting baking of waffles at a predetermined time and temperature.

Sixth, to provide a dispenser as outlined which is simple in construction, economical to manufacture, and easy, convenient and rapid to operate.

In describing the invention reference will be had to the accompanying drawings, in which:

Fig. 1 is a side elevation of the invention in dispensing position in the upper part of the view and showing in partial section in the refrigerated cabinet shown fragmentarily.

Fig. 2 is a front elevation of the invention shown in the refrigerated cabinet drawer compartments with the cabinet shown fragmentarily.

Fig. 3 is an enlarged top plan view of the dispenser shown with the cover opened for dispensing batter.

Fig. 4 is a section taken on line 4—4 of Fig. 3.

The invention is particularly adapted to an automatic waffle iron 10 having a lower grid 11 which is removably mounted on a base 12, and an upper grid 13 which is pivotally supported on a lever arm 14 as indicated at 15, and which lever arm has a hand-hold 16 at one end and is hinged at the other end on a continuously-running timer shaft 17 and timed and controlled through the timer 18 and which timer includes a clutch 19 and operating discs 20 which cooperate with the lever 14.

This timer is disclosed in my Patent Number 2,430,444, issued November 11, 1947, and operates as follows: The shaft 17 runs at constant very low speed continuously. When the lever 14 is depressed, the upper grid is lowered to the lower grid, and the clutch engages, both grids being heated electrically through the conduits 21 and 22 and thermostatically controlled, and this movement of the lever takes up on the discs 20 which have an engaging member 23 which engage the lever after the predetermined time elapse period and raise the lever and top grid to the position shown, or to an angle of about 35 to 40 degrees, and causing the clutch to disengage while the disc retains the grid in that position. This timer does not form a part of this invention but is briefly illustrated and described to better illustrate the requirement of a dispenser which is the subject of this invention.

This timer is located at the rearward end of a refrigerated cabinet 24 and on which the waffle iron bases are supported as shown. This cabinet has drawer spaces 25 to hold the dispensers 26 and 27 for preservation of the batter in the dispensers and keep the batter at an even temperature so that the waffles will bake to the same degree and the dispensers form a part of this cabinet—being stored therein, fitting within the drawer spaces, and themselves forming closures for the cabinet as is clearly illustrated.

The dispenser consists of a body portion having a bottom 28 which slopes upwardly at the forward end at an angle of 35 to 40 degrees from the horizontal as indicated at 29 to substantially conform with the angularity between the open waffle grids 11 and 13, and having side walls 30 and 31 the upper ends of which are flanged in as indicated at 32 and rolled under as indicated at 33, and a back wall 34 which has a cover plate 35 projects beyond the confines of the dispenser as indicated at 36 to form a closure for the cabinet drawer space when inserted therein.

Stud or roller-type guides 37 are mounted on the inside of the side walls in slightly spaced relation to the inturned flanges with the combined cover and gauge 38 slidable between the inturned flange and the guide studs, and this cover terminates at its rearward end in a hand-hold clip 39 terminating in a downwardly bent portion 40 which is engageable in a transverse slot 41 formed in the top of the handle 42 which is pivoted in a bracket 43 which is secured to the cover plate 35, the bracket spacing the handle a suitable distance to permit insertion of the fingers between the handle and the cover plate.

A spring catch 44 is mounted on the inside of the cover and manually releasable as by means of the trigger 45 to permit removal of the cover for cleaning, this catch functioning normally as a stop to limit the opening of the forward end of the cover to control the dispensing opening.

The operation of the invention is as follows: The dispenser has a width of spout substantially equal to the width of the grid. The cover is removed by withdrawing from the rearward end of the dispenser after releasing the stop 44, the handle dropping down about its pivot freely. The batter 46 is poured into the dispenser, the cover is replaced, being slid forwardly, the handle raised about its pivot, the engaging end 40 is engaged in the slot 41 in the top of the handle, and the cover then forced forward to completely close the forward or lip end, with the stop 44 inside the back wall 34. The dispenser is now placed in the drawer space in the cabinet, the cover plate or panel 35 sealing the cabinet by the bottom and side surrounding projecting portion 36. The batter cools to the temperature of the inside of the cabinet and is preserved under refrigerated conditions.

The waffle iron is normally open as shown in Fig. 1 and in Fig. 2, left hand illustration. The handle on the dispenser is gripped by one hand, withdrawn part way, the other hand is placed under the forward end of the dispenser, and the dispenser removed and brought up to position for dispensing, then the forward end is tilted while the handle is merely normally held. This causes the handle through the engaging end to draw the cover back until it engages the stop 44, forming a dispensing opening 47 throughout the width of the dispenser. The lip end 48 is now lowered in contact with the lower grid and drawn back, leaving a relatively thin ribbon 49 of batter distributed throughout the entire area of the grid. The dispenser is now removed, simultaneously raising the forward end which causes the dispensing opening to be closed by the cover. The dispenser is now returned to its drawer compartment, the panel projections 36 sealing the cabinet.

Thus the dispenser actually forms a part of the cabinet, and the cabinet is essential to the specific automatic baking desired, because if the temperature of the batter varies from one waffle to another, the degree of baking will be affected accordingly. As will be noted, this dispenser is specifically adapted to waffle irons having rectangular grids, and particularly suited to waffle irons in which the upper grid cannot be raised to a 90 degree angle, and it will be realized that with a waffle iron which does not open to close to 90 degrees that the conventional pitcher or spoon dispenser is not suited, and becomes almost impossible when the waffle iron opens to 45 degrees or less.

I claim:

1. A batter dispenser comprising an elongated container having side, bottom and forward and rear end walls, and a cover slidable in opposed grooves provided in the upper portions of the side walls, with the forward end wall inclined upwardly and forwardly at an angle of not to exceed 45 degrees to the horizontal and terminating in a straight lip having a width substantially equal to the width of a rectangular waffle iron grid to spread batter throughout the width of the grid, and releasable engaging means mounted on said cover adjacent the rearward end thereof and projecting downwardly through said cover for engagement with the inside of the rear wall of said container for limiting retraction of the cover to a degree sufficient only to permit passage of a relatively thin ribbon of batter as the lip of the dispenser is drawn back over the grid.

2. A structure as defined in claim 1; said stop means including manually operable releasing means: a combined handle and cover retracting and advancing means having its lower end pivotally supported in spaced relation to the lower end of said rear wall and having a transverse slot formed downwardly from the upper end; said cover terminating in a downturned portion projecting rearwardly of said rear end wall to engage in said slot when the cover is in its position of limited movement, and released to permit removal of the cover from said container when said stop means is manually released and the cover is withdrawn beyond said position of limited movement, with said cover being retracted when said handle is held in a predetermined plane and the dispenser is lifted from a support thereby and closed when the dispenser is returned to the support.

3. A structure as defined in claim 1; said stop means including manually operable releasing means, a handle having its lower end pivotally supported in spaced relation to the lower end of said rear wall and having a transverse slot formed downwardly from the upper end; said cover terminating in a downturned portion extending rearwardly beyond said rear end wall to engage in said slot when the cover is in its operative portion of its dispensing and closing position, and released to permit removal of the cover from said container when said stop means is manually released; said handle retracting said cover to dispensing position when moved rearwardly about its pivotal support, and closing said cover when advanced about its pivotal support, for automatic opening of the cover when the dispenser is lifted by the handle, and for automatic closing when the dispenser is returned to a supporting surface.

4. A batter dispenser comprising a container rectangular in cross-section and having bottom, side, front and rear end walls, and a removable sliding cover forming the top wall, with the front end wall inclined upwardly at an angle of less than 45 degrees to the horizontal and terminating in a straight lip extending throughout the width of the dispenser for dispensing to a lower grid of a waffle iron when raising of the upper grid is limited to an angle of less than 45 degrees; a handle pivotally connected at its lower end in spaced relation to the rear end wall and having releasable connecting means at its upper end for connection to the rearward end of the sliding cover for slidably advancing and retracting said cover, and releasable stop means on said cover for cooperation with said rear end wall and interiorly thereof for limiting the retraction of said cover to a degree to form a very narrow opening along the lip to dispense a relatively thin ribbon of batter onto the lower grid of a waffle iron.

5. A batter dispenser for a waffle iron having rectangular grids comprising; an elongated container rectangular in cross-section and having side walls and front and rear end walls, with said front end wall being inclined upwardly at an angle of approximately 35 degrees to enter to the forward end of a waffle iron having an upper grid limited to less than 45 degree raising with said inclined front end wall terminating in a lip extending through the width of said container; said side walls having inturned flanges at their upper ends; a cover for said container and slidable under said flanges; a series of spaced studs cooperating with the underside of said cover; a bracket mounted at the lower end of said rear end wall and having a transverse slot formed in the upper end; said cover having a rearward extension terminating in a depending portion to releasably engage in said slot for advancing and retracting said cover through movement of said handle relative to said rear end wall, and for releasing for complete removal of said cover; and stop means cooperative between said cover and said container for limiting retraction of the front end from the lip to a predetermined degree to provide a dispensing opening for spreading a ribbon of batter from the forward end to the rear end of the lower grid when the lip is retracted along the grid; with said cover opening when the handle is held and the front end of the dispenser is lowered for dispensing, and closing when the front end of the dispenser is raised.

KEN E. BEMIS.

REFERENCES CITED

The following references are of record in the file of this patent:

UNITED STATES PATENTS

| Number | Name | Date |
|---|---|---|
| 1,117,929 | Turnbull et al. | Nov. 17, 1914 |
| 1,882,209 | Copeman | Oct. 11, 1932 |